United States Patent
Takebayashi

[11] Patent Number: 5,821,525
[45] Date of Patent: Oct. 13, 1998

[54] READER/WRITER FOR USE WITH NON-CONTACT IC CARD AND READER/WRITER SYSTEM

[75] Inventor: Etsushi Takebayashi, Itami, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 510,411

[22] Filed: Aug. 2, 1995

[30] Foreign Application Priority Data

Aug. 3, 1994 [JP] Japan .................................. 6-182434

[51] Int. Cl.⁶ ........................... G06K 19/06; G06F 17/00
[52] U.S. Cl. ........................ 235/492; 235/375; 343/895
[58] Field of Search ................................. 235/375, 491, 235/492, 493; 343/742, 867, 895; 340/572

[56] References Cited

U.S. PATENT DOCUMENTS

| | | | |
|---|---|---|---|
| 2,266,630 | 12/1941 | Forbes | 343/867 |
| 4,303,904 | 12/1981 | Chasek | 235/384 X |
| 4,580,041 | 4/1986 | Walton | 235/380 |
| 4,600,829 | 7/1986 | Walton | 235/492 X |
| 4,656,463 | 4/1987 | Anders et al. | 340/572 |
| 4,673,932 | 6/1987 | Ekchian et al. | 235/385 X |
| 4,774,521 | 9/1988 | Okada et al. | 343/895 |
| 4,827,115 | 5/1989 | Uchida et al. | 235/492 X |
| 4,918,296 | 4/1990 | Fujisaka et al. | 235/375 X |
| 5,061,941 | 10/1991 | Lizzi et al. | 343/742 X |
| 5,305,008 | 4/1994 | Turner et al. | 342/44 |
| 5,337,063 | 8/1994 | Takahira | 343/895 |
| 5,347,263 | 9/1994 | Carroll et al. | 235/382 X |
| 5,406,275 | 4/1995 | Hassett et al. | 235/384 X |
| 5,444,222 | 8/1995 | Inoue | 235/380 |
| 5,467,082 | 11/1995 | Sanderson | 340/825.54 |
| 5,539,188 | 7/1996 | Fallah et al. | 235/375 |

FOREIGN PATENT DOCUMENTS

| | | | |
|---|---|---|---|
| 2663145 | 12/1991 | France | 340/572 |
| 2077555 | 12/1981 | United Kingdom . | |

OTHER PUBLICATIONS

"Data Carrier Technology and Applications—Changes in Factory Automation, Distribution and Security", AIM Japan, Oct. 20, 1990, pp. 18–23.

"Data Carrier II", Japan Industrial Newspaper Company, Mar. 15, 1991, pp. 170–181.

*Primary Examiner*—Donald T. Hajec
*Assistant Examiner*—Thien Minh Le
*Attorney, Agent, or Firm*—Leydig, Voit & Mayer, Ltd.

[57] ABSTRACT

A non-contact IC card reader/writer which offers an improved reliability in communication between a non-contact IC card and its reader/writer by reducing malfunction due to data communication error. The reader/writer includes a reader/writer main body electrically connected to a host machine for controlling communications, and an antenna external to and electrically connected to the reader/writer main body for transmitting and receiving electromagnetic waves to and from the non-contact IC card. Since the antenna is L-shaped in cross section, the non-contact IC card is free from right-angle antenna geometry to the antenna and maintains a good communications link with the reader/writer.

10 Claims, 14 Drawing Sheets

READER/WRITER FOR USE WITH NON-CONTACT IC CARD AND READER/WRITER SYSTEM

BACKGROUND OF THE INVENTION

1. Field of the Invention

The present invention relates to a non-contact IC card reader/writer and reader/writer system using the same that allows a non-contact IC card to communicate with a host machine.

2. Description of the Related Art

FIG. 18 is a system configuration diagram showing a known non-contact IC card communications system in which medium-frequency-band electromagnetic wave is used for communications with a non-contact IC card. As shown, a reader/writer 1 is electrically linked via a communications line 1a with an external apparatus 2 which is a host machine such as a personal computer, and communicates with the external apparatus 2 is through the communication line 1a. Also provided is an antenna 6 to which the reader/writer 1 is linked via an antenna cable 6a. The reader/writer 1 performs wireless communications with a non-contact IC card 8 via the antenna 6 by means of electromagnetic wave 13.

FIG. 19 is a block diagram showing the known reader/writer 1. As shown, the reader/writer-1 contains an input/output circuit 3 for inputting and outputting bidirectional data with the external apparatus 2, a control circuit 4 for controlling the operation of the reader/writer 1, and a transmitter-receiver circuit 5 for modulating a digital signal to be transmitted into an analog signal and for demodulating a received analog signal into a digital signal. The transmitter-receiver circuit 5 is electrically connected to the antenna 6 which actually transmits and receives electromagnetic waves for data communications. Preferred as the antenna 6 is a loop antenna which is constructed of copper wire 7 coiled in a loop as shown in FIG. 19 when data communication is performed using medium-frequency-band electromagnetic wave.

FIG. 20 is a block diagram showing the construction of the non-contact IC card 8. As shown, the non-contact IC card 8 contains CPU 9 for executing a program, ROM 10 for storing fixed data and the program that drives CPU 9, RAM 11 for storing temporary data and variable data, an input/output control circuit 12 for controlling data input from and output to the external apparatus 2, a battery 15 for feeding power to each circuit, an internal bus 16 connected to CPU 9, ROM 10, RAM 11 and the input/output control circuit 12 for transferring data and address data, an antenna resonant circuit 14 for transmitting to and receiving from the reader/writer 1 electromagnetic wave 13, and a modulator/demodulator circuit 17 electrically connected between the antenna resonant circuit 14 and the input/output control circuit 12, for demodulating the electromagnetic wave signal that is received by the antenna resonant circuit 14 into a digital signal, and for modulating the signal from the input/output control circuit 12. The coil 14a of the antenna resonant circuit 14 in the non-contact IC card 8 is of a loop antenna which is constructed of a copper wire coiled in a loop in a way similar to the antenna 6 for the reader/writer 1 in FIG. 19.

FIG. 21 shows a typical directivity pattern of the loop antenna 6 of the reader/writer 1 in FIG. 19 or of the loop antenna that makes up the antenna resonant circuit 14 of the non-contact IC card 8 in FIG. 20. An access area 18 enclosed by the broken line in FIG. 21 represents the area where communications are possible. Such a directivity pattern as shown in FIG. 21 is particularly true in the vicinity of the loop antenna that transmits a weak electromagnetic wave.

FIGS. 22 and 23 diagrammatically show access areas or directivity pattern where communications are performed between the reader/writer 1 and the non-contact IC card. FIG. 22 shows one antenna geometry in which both the plane of the antenna 6 of the reader/writer 1 and the plane of the antenna of the non-contact IC card 8 are parallel, and FIG. 23 shows another antenna geometry in which both antenna planes make a right angle with each other. As shown, an area enclosed by the broken line 18a represents the access area offered by the antenna 6 of the reader/writer 1, and an area enclosed by the broken line 18b represents the access area offered by the non-contact IC card 8. To establish communications between the reader/writer 1 and the non-contact IC card 8, the access area 18a of the antenna 6 of the reader/writer 1 and the access area 18b of the non-contact IC card 8 should share a substantially overlapped area in common as shown in FIG. 22, namely the main lobes of antenna directivity patterns should be aligned. If the access area 18a of the antenna 6 of the reader/writer 1 fails to agree with the access area 18b of the non-contact IC card 8 as shown in FIG. 23, bidirectional communications cannot be performed or will be degraded.

As understood from the directivity antenna pattern of the loop antenna shown in FIG. 21, to communicate between the reader/writer 1 and the non-contact IC card 8, therefore, transmission and reception are most efficiently performed when the antenna 6 of the reader/writer 1 is arranged in parallel with the antenna resonant circuit 14 of the non-contact IC card 8 as shown in FIG. 22. When both antenna are arranged at a right angle to each other, the system's efficiency in transmission and reception suffers most. Namely, in practice, the parallel antenna geometry assures data communication between distantly separated points. In the right-angle antenna geometry, however, actual communication range is severely limited.

Discussed next is the operation of the non-contact IC card 8, in particular, for receiving and processing a trigger signal and data signal. As already described, the non-contact IC card 8 transmittes and receives data with the reader/writer 1 using electromagnetic wave 13. In its non-operative state, namely, standby state, the non-contact IC card 8 disables its clock 9a to save power of the battery 15 (FIG. 20). The non-contact IC card 8 is put into operation at the time it receives a trigger signal or a card operation start signal from the reader/writer 1. Upon receiving the trigger signal, the non-contact IC card 8 demodulates and transfers it to the input/output control circuit 12, CPU 9, ROM 10 and RAM 11, and activates the clock 9a to start the operation. The non-contact IC card 8 thereafter operates in response to the content of data that follows the trigger signal. Therefore, the non-contact IC card 8 is first activated by the trigger signal and processes the data received after the trigger signal to perform its operation.

In the known non-contact IC card communications system that performs data communication using weak a medium-frequency-band electromagnetic wave, both the antenna 6 of the reader/writer 1 and the antenna resonant circuit 14 of the non-contact IC card 8 are loop antennas, and their directivity pattern is as shown in FIG. 21. Communications within the access area 18 only are assured. In actual communications of data, transmission and reception are most efficiently performed when the antenna 6 of the reader/writer 1 is in parallel with the antenna resonant circuit 14 of the non-contact IC card 8 as shown in FIG. 22. When both antennas are at a right angle to each other as shown in FIG. 23, transmission and reception suffer degradation. Communication range is thus varied and therefore data communication is successful sometimes and unsuccessful other times depending on the orientation or geometry of the access area 18a relative to the access area 18b even for the same reader/writer 1 and the same non-contact IC card 8. Reliability of communications is poor, and malfunction takes place as a result of data communication error.

As already described, the non-contact IC card 8 starts its operation upon receiving the trigger signal or operation start signal from the reader/writer 1. The non-contact IC card 8 processes the data signal received after to the trigger signal. The levels of the trigger signal and data signals remain the same, because the same antenna resonant circuit 14 in the non-contact IC card 8 is used to receive them. The non-contact IC card 8 may be activated with its access area 18b marginally overlapped with the access area 18a of the reader/writer 1. Reception of the data signal may be interrupted even if the trigger signal preceding the data signal has been successfully received, the because communicable range is affected by a change in the geometry or orientation of the access area 18b relative to the access area 18a. The non-contact IC card 8 thus malfunctions. Such a problem has frequently occurred, because the non-contact IC card 8 is in many cases transported transversely across the side of the antenna 6 in FIG. 18 while it is being used.

SUMMARY OF THE INVENTION

The present invention has been developed to solve the above problem. It is an object of the present invention to provide a non-contact IC card reader/writer and a reader/writer system which offer an improved reliability in communications with a non-contact IC card and which prevents communication malfunction due to data communication error between the reader/writer and the non-contact IC card.

To achieve the above object, the present invention includes a non-contact IC card reader/writer allowing a non-contact IC card to communicate with a host machine, said non-contact IC card reader/writer comprising a reader/writer main body electrically connected to the host machine for controlling the communication, and an antenna means disposed external to and electrically connected to the main body for transmitting and receiving electromagnetic wave to and from the non-contact IC card in a wireless manner, said antenna means having a board with a plurality of plane portions which make an angle with each other and on which a conductor wire wound in a coil.

Another aspect of the present invention lies in a non-contact IC card reader/writer allowing a non-contact IC card to communicate with a host machine, said non-contact IC card reader/writer comprising a reader/writer main block electrically connected to the host machine for controlling the communication and an antenna means disposed external to and electrically connected to the main body for transmitting and receiving electromagnetic wave to and from the non-contact IC card in a wireless manner, said antenna means having a plurality of plane portions which are spaced apart and make an angle to each other and a plurality of conductor wires, each wound in a coil on each plane portion.

Still another aspect of the present invention lies in the reader/writer main body that comprises input/output means electrically connected to the host machine for outputting and inputting a bidirectional signal to and from the host machine, transmitter-receiver means for modulating into and demodulating electromagnetic wave that is transmitted and received by the antenna means, control means electrically connected between the input/output means and the transmitter-receiver means, for performing control, and antenna control means for switching conductor wires on the plurality of plane portions at predetermined intervals.

A further aspect of the present invention lies in a non-contact IC card reader/writer allowing a non-contact IC card to communicate with a host machine, said non-contact IC card reader/writer comprising input/output means electrically connected to the host machine for outputting to and inputting from the host machine a bidirectional signal, transmitter-receiver means for modulating into and demodulating electromagnetic wave that is transmitted and received by an antenna means, control means electrically connected between the input/output means and the transmitter-receiver means, for performing control, and by-signal level switching means for switching the strength of output electromagnetic wave emitted by the antenna means between trigger signal transmission and data signal transmission.

An additional aspect of the present invention lies in a non-contact IC card reader/writer allowing a non-contact IC card to communicate with a host machine, said non-contact IC card reader/writer comprising input/output means electrically connected to the host machine for outputting to and inputting from the host machine a bidirectional signal, transmitter-receiver means for modulating into and demodulating electromagnetic wave that is transmitted and received by antenna means, control means electrically connected between the input/output means and the transmitter-receiver means, for performing control, and by-time level switching means for switching alternately the strength of output electromagnetic wave to transmit the signal of the same content at a plurality of transmission signal strengths.

Still a further aspect of the present invention comprises the by-signal level switching means that switches the strength of output electromagnetic wave emitted by the antenna means between trigger signal transmission and data signal transmission.

According to one embodiment, of the present invention comprises a plurality of antenna means.

An additional aspect of the present invention comprises the reader/writer main body that is provided with a plurality of connection means selectively connected to the antenna means.

Still a further aspect of the present invention comprises a repeater, said repeater comprising control means remotely disposed between the antenna means of the non-contact IC card reader/writer and the non-contact IC card, for controlling the entire operation of the system, antenna means for performing transmission and reception of electromagnetic wave between the non-contact IC card reader/writer and the non-contact IC card, demodulator means for demodulating the received electromagnetic wave, memory means for temporarily storing the demodulated signal, modulator means for modulating the temporarily stored signal, and input/output control means electrically connected to the demodulator means and the modulator means for controlling input and output of signals.

In one embodiment of the present invention, the board of the antenna means of the non-contact IC card reader/writer is constructed of the plurality of plane portions which make an angle with each other and on which a conductor wire is wound in a coil. One of the plane portions in the antenna means is off right-angle antenna geometry with the non-contact IC card in a random orientation. Normal communications are thus assured.

In another embodiment of the present invention, the board of the antenna means of the non-contact IC card reader/writer is constructed of a plurality of plane portions which are spaced apart and make an angle to each other and a plurality of wires, each wound on each plane portion. One of the plane portions in the antenna means is necessarily in approximate parallel antenna geometry with the non-contact IC card in a random orientation. Normal communications are thus constantly assured. Furthermore, since the plurality of plane portions are arranged in an arbitrary angle, convenience of design and installation is enhanced.

In still another embodiment of the present invention, the board of the antenna means is constructed of a plurality of plane portions that are spaced apart and a plurality of conductor wires disposed on the plane portions, and furthermore the antenna control means is provided to switch the conductor wires on a time sharing manner. Regardless of orientation of the non-contact IC card, one conductor wire disposed on a board that is properly oriented is used for communications.

In yet another embodiment of the present invention, the by-signal level switching means is provided to switchably select transmission level to the non-contact IC card, namely switch between data transmission level and trigger transmission level, wherein the data transmission level is set to be higher than the trigger transmission level. Once the non-contact IC card is activated by the trigger signal, it assuredly acquires the data signal that follows the trigger signal.

In a further embodiment of the present invention, the by-time level switching means is provided to switch the transmission level every cycle of transmission to transmit the signal of the same content at a plurality of transmission levels. There is no need for replacing the antenna means when switching between long and short distance communications. The same antenna means serves excellently both the long and short distance communications.

In still a further embodiment of the present invention, the by-signal level switching means is provided to switch between data transmission level and trigger transmission level, and furthermore the by-time level switching means is provided to switch the transmission level every cycle of transmission. Thus, the same antenna means serves long and short distance communications. When the non-contact IC card is activated by the trigger signal, it assuredly acquires the data signal that follows the trigger signal.

In yet another embodiment of the present invention, a plurality of antenna means are provided. Communicable range is thus expanded.

In an additional embodiment of the present invention, the reader/writer main body is provided with a plurality of connection means that are selectively connected to the antenna cable of the antenna means to meet operating environments. This arrangement makes it unnecessary for the antenna cable to run behind the antenna means, thereby avoiding interference between the antenna cable and the antenna means.

In another embodiment of the present invention, the repeater is provided to function as relay means between the antenna of the non-contact IC card reader/writer and the non-contact IC card. Communicable range is thus expanded.

BRIEF DESCRIPTION OF THE DRAWINGS

The present invention will become more readily apparent from the following detailed description of the preferred embodiments of the present invention taken in conjunction with the accompanying drawings, in which.

DETAILED DESCRIPTION OF THE PREFERRED EMBODIMENTS

Embodiment 1

Figure 1:
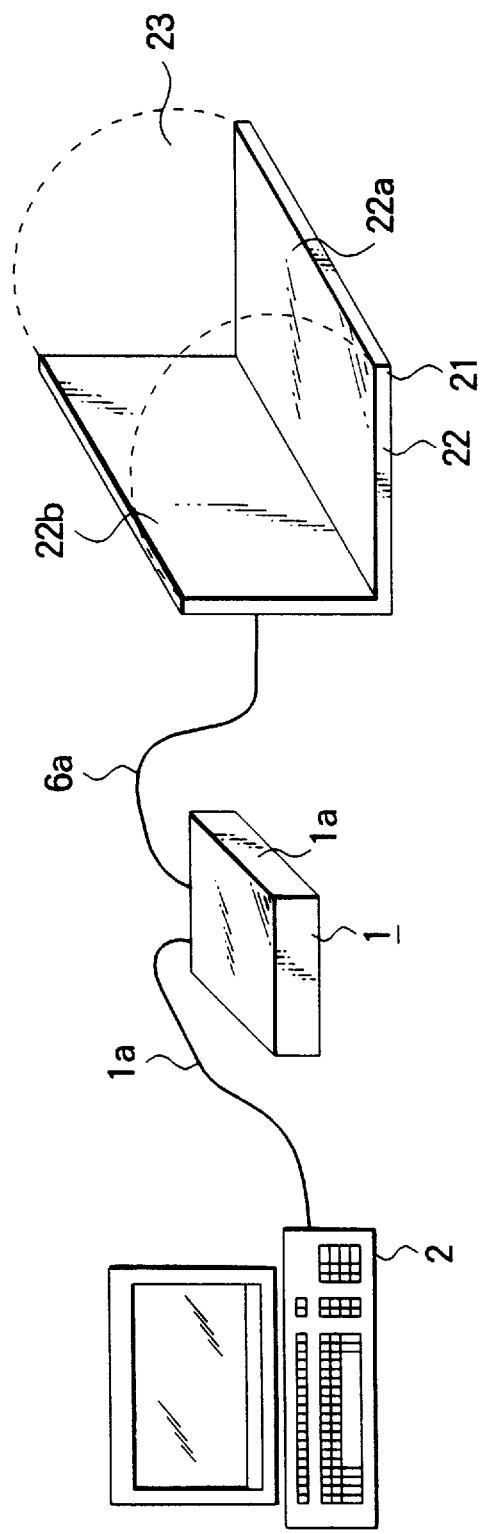
FIG. 1 is a perspective view showing the embodiment 1 of the non-contact IC card reader/writer communications system according to the present invention.
Figure 2:
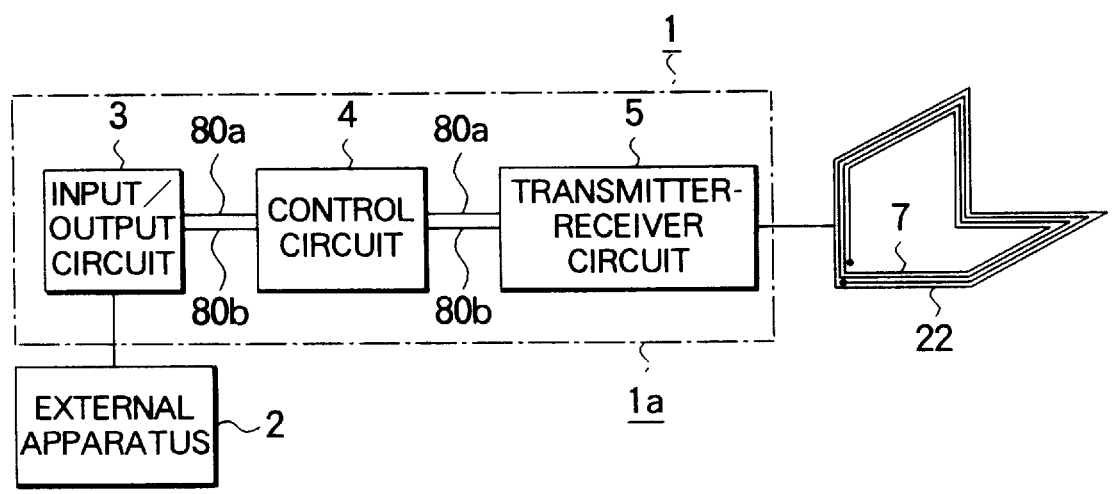
FIG. 2 is a diagram showing the construction of the non-contact IC card reader/writer of FIG. 1.

Referring now to the drawings, the embodiments of the present invention are discussed. FIGS. 1 and 2 are the perspective view and the block diagram showing the communications system of the embodiment 1, wherein normal communications are assured even when the non-contact IC card 8 is positioned in any direction or orientation to the antenna 22 of the reader/writer 1. As shown, the reader/writer 1 according to the present invention comprises a reader/writer main body 1a and the antenna 22 which is external to and electrically connected to the reader/writer main body 1a via an antenna cable 6a. In contrast to the known antenna 6 that has a flat configuration (FIG. 18), the antenna 22 in this embodiment is constructed of two planes 22a and 22b which make a predetermined angle with each other. The rest of the construction is basically the same as that of the related art in FIG. 18, and the description thereof will not be repeated herein. The predetermined angle which the two planes 22a and 22b make is preferably a right angle. Alternatively, however, to meet environmental conditions, the angle between two planes 22a and 22b may be arbitrarily set to any degree other than 180°. As shown in FIG. 2, the antenna 22 is formed as a loop antenna in which a single copper wire 7 is coiled in a loop along over both planes 22a and 22b of a board 21. The antenna 22 may be easily manufactured, for example, by closely winding the copper wire 7 in a rectangular loop on the flat board 21 like the known antenna 6 in FIG. 19, and then bending the board 21 together with the wound copper wire 7 at a predetermined angle.

The antenna 22 in this embodiment comprises the copper wire 7 continuously and three dimensionally coiled in a loop across the two planes 22a and 22b. When the antenna 22 is placed with plane 22a in parallel with the ground, the other plane 22b is positioned upright. Either in being parallel or upright position to the ground, the non-contact IC card 8 (FIG. 18) is positioned substantially parallel with the plane 22a or plane 22b of the antenna 22 in the reader/writer 1. Therefore, in either case, data communication is performed successfully, and communicable range is wide compared to the above-mentioned related art. With the antenna 22 in this embodiment, the access area 23 shown by the broken line of FIG. 1 is a communicable range. As long as the non-contact IC card 8 is operated within the access area 23, communications can be established regardless of antenna geometry of the non-contact IC card 8 relative to the antenna 22 of the reader/writer 1.

Figure 20:
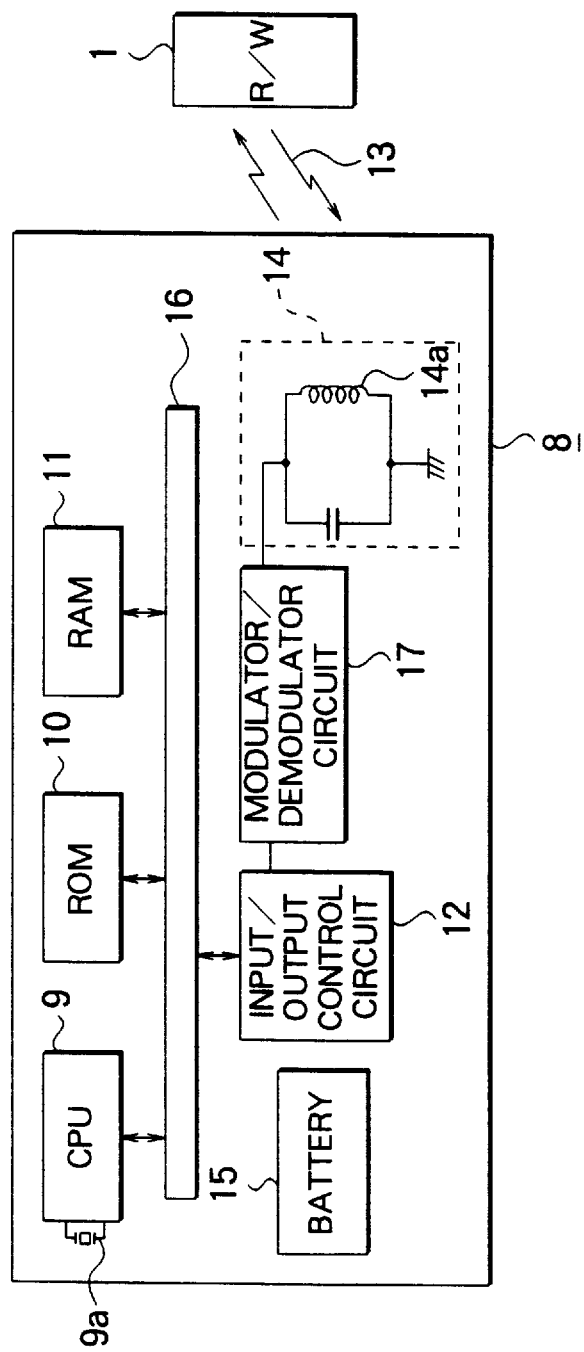
FIG. 20 is a block diagram showing the construction of a privately known non-contact IC card.
Figure 21:
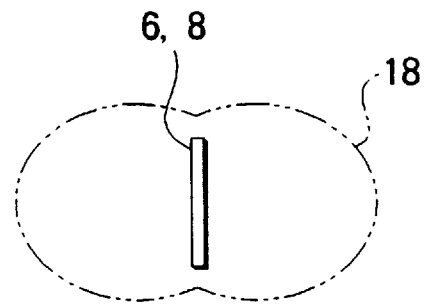
FIG. 21 is a directivity pattern diagram showing the directivity of a known flat loop antenna.
Figure 23:
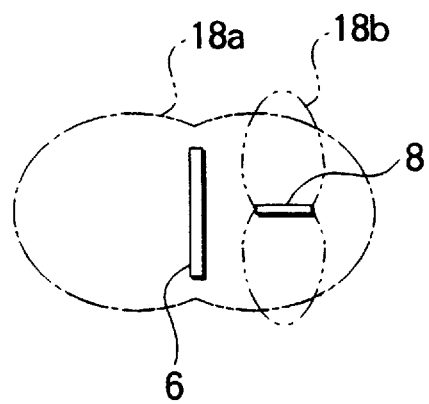
FIG. 23 is a directivity pattern diagram showing directivity patterns of the known flat loop antenna and the non-contact IC card.

As already mentioned, communications encounter a substantial difficulty when the non-contact IC card 8 is approximately at a right angle to the antenna 6 of the reader/writer 1 as shown in FIG. 23. Successful communications are assured as shown in FIG. 20 when the non-contact IC card 8 is in parallel with or even at a slight slant rather than exactly parallel with the antenna 6. In this embodiment, the non-contact IC card 8 cannot be just at a right angle to both planes 22a and 22b of the antenna 22 in any antenna geometry, and remains communicable with either the plane 22a or the plane 22b of the antenna 22. The non-contact IC card 8 can thus communicate with the reader/writer regardless of its position with respect to the reader/writer 1.

Figure 18:
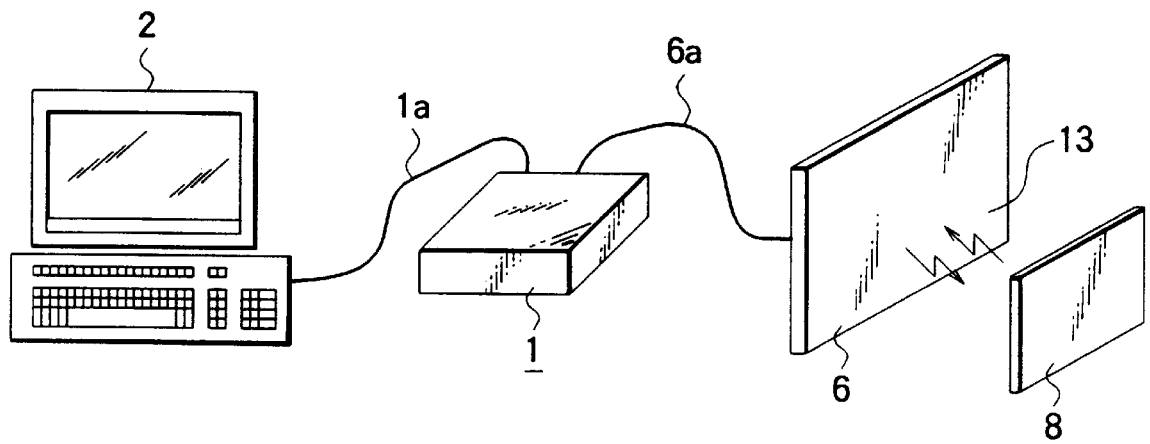
FIG. 18 is a perspective view showing a communications system using a privately known non-contact IC card reader/writer.
Figure 19:
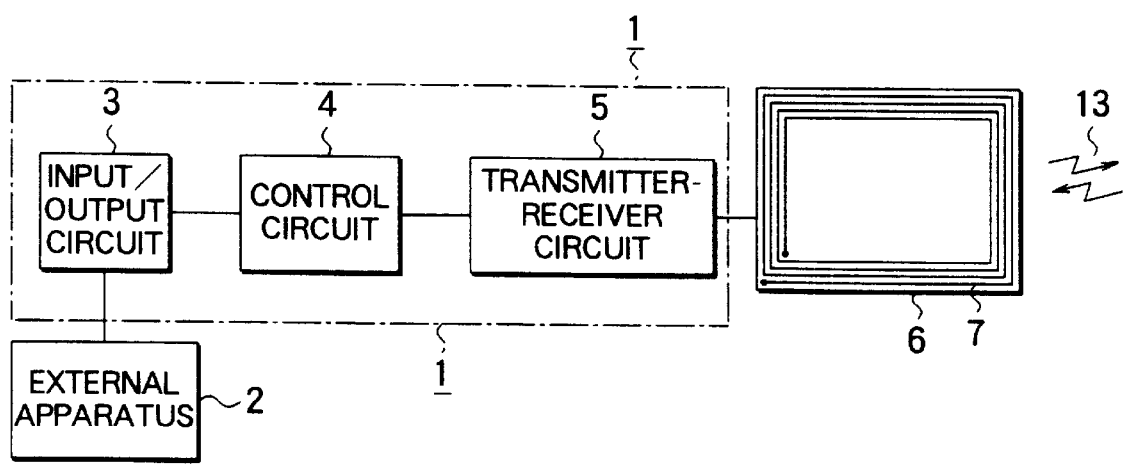
FIG. 19 is a block diagram showing the communications system of FIG. 16.

In contrast to the known antenna 6 in FIG. 18, the antenna 22 in this embodiment can offer an expanded communication range where the non-contact IC card 8 maintains good communication with the reader/writer 1. The non-contact IC card 8 cannot be just at a right angle to both the planes 22a and 22b of the antenna 22 of the reader/writer 1 at the same time. Even if the non-contact IC card 8 is at a right angle to one plane, for example, 22a, it is not at a right angle to the other plane, 22b. Communications are thus constantly kept good. The use of the antenna 22 thus solves such a problem that a change in the direction of the non-contact IC card 8 varies communicable range even within the access area of the reader/writer 1. Malfunction attributed to data communication error between the reader/writer 1 and the non-contact IC card 8 is thus prevented, and reliability of communications is enhanced.

Figure 3:
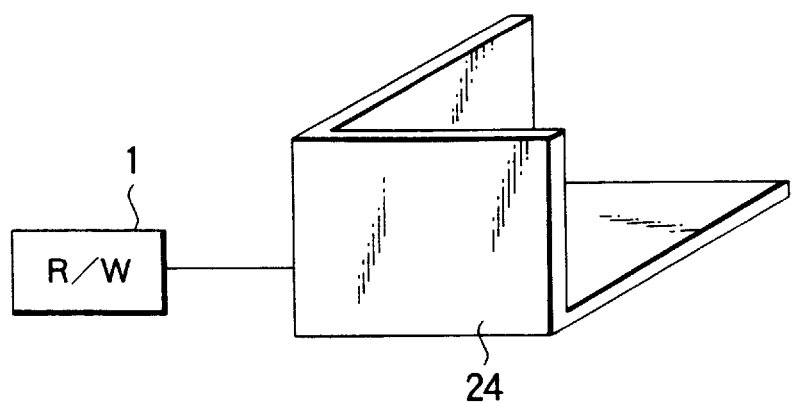
FIG. 3 is a diagram showing another form of the antenna of the embodiment 1 of the non-contact IC card reader/writer according to the present invention.

In the above embodiment, the antenna 22 of the reader/writer 1 is constructed of two planes for convenience. FIG. 3 shows an alternative, wherein the antenna 24 is constructed of three mutually perpendicular planes. In this case, the copper wire 7 may be coiled in a loop across three planes like the previous embodiment, or the copper wire 7 may be coiled in three separate loops on the three planes. The antenna 24 with three planes offers even better antenna geometry in which a reliable and assured communication is maintained between the non-contact IC card 8 and the antenna 24. Communications are thus constantly and excellently performed with a good accuracy.

Embodiment 2

Figure 4:
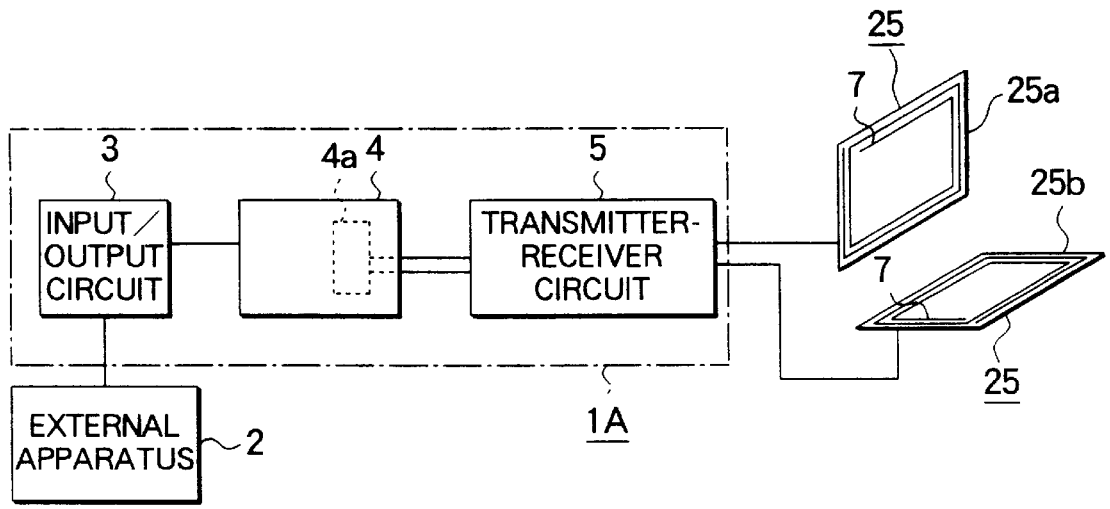
FIG. 4 is a diagram showing the embodiment 2 of the non-contact IC card reader/writer communications system according to the present invention.

FIG. 4 shows a reader/writer 1 and its antenna 25 according to the second embodiment of the present invention. As shown, the antenna 25 is constructed of two separate antenna elements 25a and 25b, respectively positioned upright and parallel to the ground. In this embodiment, two antenna elements 25a, 25b constituting the antenna 25 are fixed at a right angle to each other. Namely, both elements 25a, 25b are spaced apart with one upright and the other parallel to the ground. Each of the antenna elements 25a, 25b is produced as a loop antenna, by coiling the copper wire 7 in a loop on each board in the same manner as in the related art in FIG. 19. The reader/writer 1A remains identical to the known reader/writer 1 (FIG. 19) except that the control circuit 4 in the reader/writer 1A has a communications control circuit 4a for selectively switching back and forth between the antenna elements 25a, 25b on a time sharing basis and for using the selected antenna element for communications.

Figure 5:
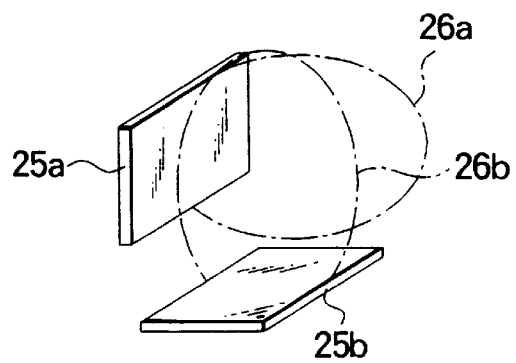
FIG. 5 is an antenna directivity pattern diagram of the non-contact IC card reader/writer of FIG. 4.

In this embodiment, the antenna elements 25a, 25b are selectively switched on a time sharing basis for communications by the communications control circuit 4a in the reader/writer 1A. FIG. 5 shows respective access areas represented by phantom lines 26a, 26b corresponding to the antenna elements 25a, 25b in operation. The switching sequence of the communications control circuit 4a is typically as follows: when the transmission of a communication data block starts via the antenna element 25a, the communication control circuit 4a recognizes the transmission by monitoring a start code at the front of the communication data block; the non-contact IC card 8 receives the block, and upon completion of the transmission of the communication data block, the non-contact IC card 8 gives an acknowledgement; when no acknowledgement is received from the non-contact IC card 8 within a predetermined time subsequent to the completion of the transmission, the transmission of the communication data block to the non-contact IC card 8 via the anntenna element 25*a* is considered unsuccessful; and the communications control circuit 4*a* switches to the other antenna element 25*b*.

According to the second embodiment of the reader/writer 1A with the antenna 25, the antenna elements 25*a*, 25*b* are selectively switched on a time sharing basis by communication data block depending on the presence or absence of the acknowledgement from the non-contact IC card 8 subsequent to the completion of the transmission of the communication data block. Until an acknowledgement is received from the non-contact IC card 8, the communication data block of the same content is repeatedly transmitted while the antenna elements 25*a*, 25*b* are selectively switched. Regardless of its direction or orientation, the non-contact IC card 8 establishes a communication link with either the antenna element 25*a* or 25*b*, whichever is oriented properly relative to the non-contact IC card 8. Thus, communications are performed successfully. The antenna elements 25*a*, 25*b* may be spaced apart or disposed close to each other. Furthermore, the angle which both antenna elements make is not limited to 90° and may be any degree other than 0° or 180°. The antenna 25 may arbitrarily arranged for convenience, with the freedom not to follow the above mounting method with one antenna element upright and the other element parallel to the ground.

In the above embodiment, two antenna elements 25*a*, 25*b* are employed for communications. Alternatively, three antenna elements or more may be employed and switched for communications on a time sharing basis. Such an arrangement offers the same advantage.

According to this embodiment, the reader/writer 1A and the antenna 25 assure a good communication by selecting either the antenna element 25*a* or 25*b*, whichever is suited to communications with the non-contact IC card 8. This second embodiment thus offer the same advantage as that of the previous embodiment, and achieves a reliable communication. Furthermore, since the antenna is set up with its elements arbitrarily angled relative to the ground, communication range and convenience of mounting are enhanced.

Embodiment 3

Figure 6:
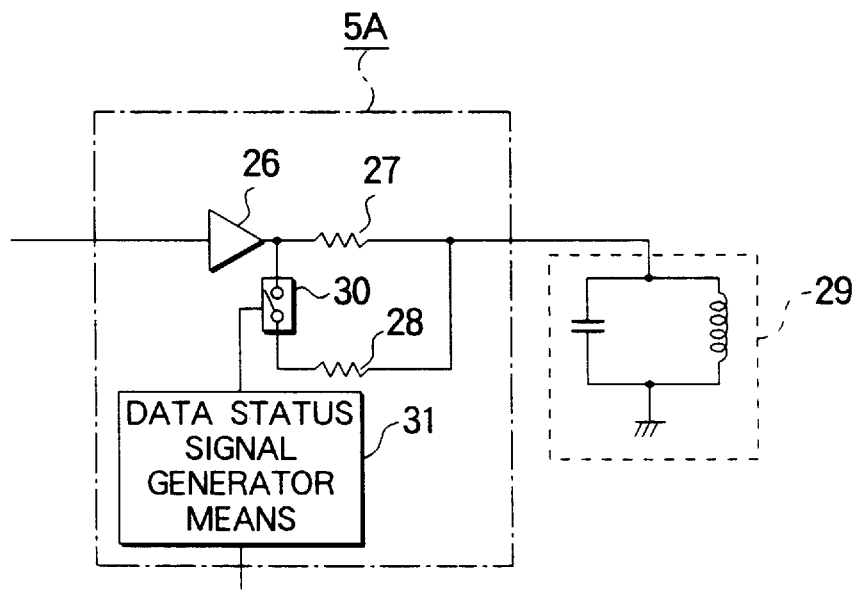
FIG. 6 is a block diagram showing the transmitter circuit disposed in the embodiment 3 of the non-contact IC card reader/writer according to the present invention.
Figure 7:
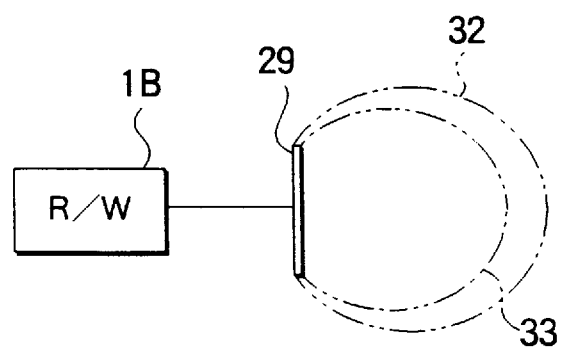
FIG. 7 is an antenna directivity pattern diagram showing communicable range when the transmitter circuit of FIG. 6 switches between the trigger signal transmission and the data signal transmission.

FIG. 6 is the block diagram showing the construction of a transmitter circuit 5A in the reader/writer 1 of the third embodiment according to the present invention. As shown, this embodiment employs the transmitter circuit 5A instead of the transmitter circuit portion of the transmitter-receiver circuit 5 in the reader/writer 1 shown in FIG. 2. The transmitter circuit 5A is transmission level switching means that switches between trigger signal transmission level and data signal transmission level. As shown in FIG. 6, the transmitter circuit 5A comprises an amplifier 26 for amplifying transmission signals, resistors 27 and 28 for adjusting transmission level, an antenna circuit 29 made of an LC parallel resonant circuit for actually transmitting electromagnetic wave, an electronic switch 30 that switches on or off the resistor 28 to be active or inactive, and data status signal generator means 31 that controls the electronic switch 30 by generating a signal that causes the electronic switch 30 to switch on during data transmission. As shown in FIG. 2, the reader/writer has a signal line 80*a* for the trigger signal and a signal line 80*b* for the data signal. The control circuit 4 monitors two signal lines 80*a*, 80*b* to determine whether a transmitted signal is a trigger signal or a data signal. If it is a data signal, the data status signal generator means 31 generates a signal that causes the electronic switch 31 to switch on, upon receiving the signal from the control circuit 4. The data status signal generator 31 is not required always to be a separate block as shown in FIG. 6, and it may be built in the control circuit 4. FIG. 7 is the antenna directivity pattern diagram showing communicable range when the transmitter circuit 5A switches between the trigger signal transmission and the data signal transmission. As shown, this embodiment is designed so that the trigger signal transmission service area 33 is narrower than the data signal transmission service area 32.

The operation of the communications system is now discussed. As already described, since the known reader/writer 1 transmits electromagnetic waves of the trigger signal and data signal at the same signal strength, reception of the data signal subsequent to the trigger signal may be interrupted even if the non-contact IC card 8 is activated as a result of successful reception of the trigger signal in the marginal access area of the reader/writer 1. In this embodiment of the present invention, the transmission level is switched by allowing the data status signal generator means 31 to control the switch 30 so that it is on or off to connect the resistor 28 into or out of the output signal line from the amplifier 26. Specifically, during data transmission, the data status signal generator circuit 31 gives a signal that causes the switch 30 to turn on, and the resistor 28 is connected in parallel with the resistor 27, and the total resistance is thus decreased. The decreased resistance increases the current that flows in the antenna circuit 29, thereby boosting transmission level compared to the trigger signal transmission with the switch 30 turned off. As shown in FIG. 7, when the switch 30 is turned on, the reader/writer 1B offers a high transmission level, enabling the non-contact IC card 8 to receive the signal within the area 32. When the switch 30 is turned off, the non-contact IC card 8 can receive within the area 33. Therefore, as long as the non-contact IC card 8 is activated by a trigger signal, it can continuously receive the data signal that follows the trigger signal.

In this embodiment, the antenna circuit 29 employs a parallel resonant circuit. Alternatively, the embodiment accommodates any other type of antenna structure and still offers the same advantage. The configuration of the antenna 29 may be L-shaped in cross section as in the embodiment 1 (See FIGS. 1 and 3.) to expand communication range even further. In this embodiment, the switch 30 is turned on or off by the signal from the data status signal generator means 31. Alternatively, however, a trigger status signal rather than the data status signal may be used to control the switch 30 so that the data signal transmission level is set to be greater than the trigger signal transmission level. The trigger status signal may be easily generated by devising generator means similar to the data status signal generator means 31.

In the third embodiment of the reader/writer according to the present invention, transmission level is boosted when the data signal is transmitted. Once the non-contact IC card 8 is activated by a trigger signal, the data signal subsequent to the trigger signal is received. Even when the non-contact IC card 8 receives while moving, the data signal is reliably received. Malfunction due to data communication error or communications failure due to aborted communications session is prevented and communications reliability is thus enhanced.

Embodiment 4

Figure 8:
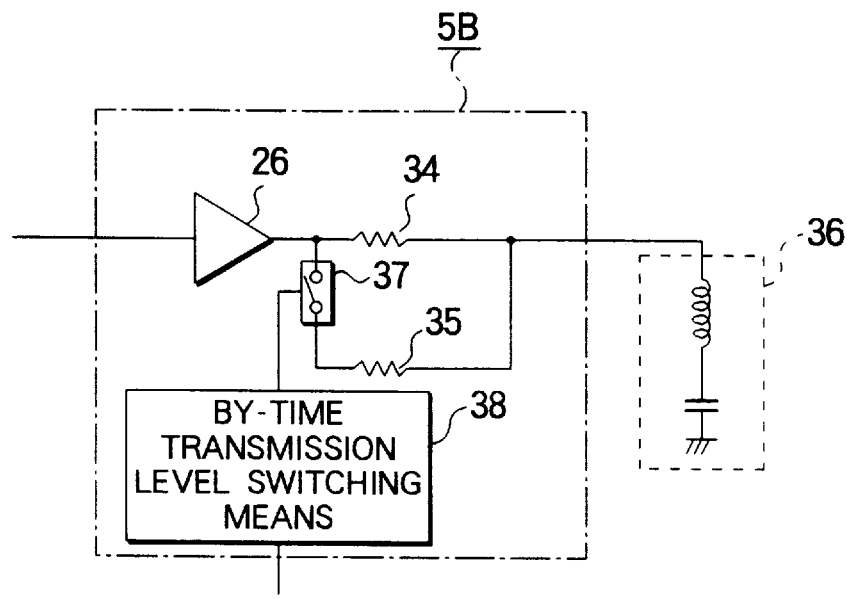
FIG. 8 is a circuit diagram showing the transmitter circuit disposed in the embodiment 4 of the non-contact IC card reader/writer according to the present invention.
Figure 24:
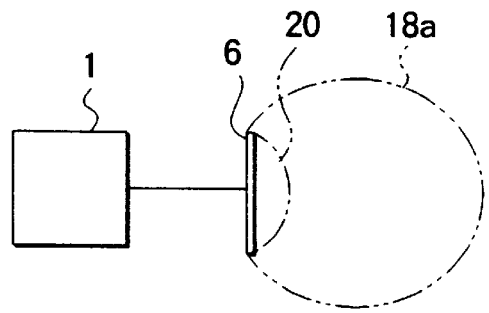
FIG. 24 is a top view showing the directivity pattern when the known non-contact IC card reader/writer gives an increased output.

FIG. 8 shows the transmitter circuit of the fourth embodiment according to the present invention. As shown in FIG. 8, this embodiment employs the transmitter circuit 5B instead of the transmitter circuit portion of the transmitter-receiver circuit 5 in the reader/writer 1 in FIG. 2. The transmitter circuit 5B in this embodiment changes transmission level at each transmission so that the signal of the same content is transmitted at a plurality of transmission levels by turns. Namely, for example, a signal of the same content is transmitted at high, middle and low levels in such a predetermined order. This operation is done at each transmission. The non-contact IC card 8 typically contains an internal battery 15 as shown in FIG. 20. An electrical processing in the non-contact IC card 8 is performed at the voltage level equal to or lower than the voltage of the battery 15. Electromagnetic wave 13 received by the antenna resonant circuit 14 can induce resultant outputs in excess of the voltage of the battery 15, namely, in excess of processing voltage level. Under such an overloading condition, the modulator/demodulator circuit 17 fails to demodulate such excess signals, thereby ending with data reception error. As shown in FIG. 24, for example, when the transmission output of the reader/writer 1 is heightened to expand its access area, a long-distance communication may be made possible. In the vicinity of the antenna 6, however, output signals from the antenna resonant circuit 14 become excessively high, thereby the modulator/demodulator circuit 17 cannot demodulate data and this results in disabling the non-contact IC card 8 from operating. As a result, an access disable area 20 takes place. In the above-mentioned related art, therefore, readers/writers 1 each having different output characteristics must be prepared to meet range requirements. A long-range communications reader/writer 1 has not been used for a short-range communication application.

In this embodiment, the transmission level is changed each transmission cycle so that the signal of the same content is transmitted at a plurality of transmission levels. The same antenna is commonly used to cover communications from short range to long range. The reader/writer 1 in this embodiment remains essentially identical to the reader/writer 1 in FIG. 2, except for the construction of the transmitter-receiver circuit. As shown in FIG. 8, the transmitter circuit 5B comprises an amplifier 26 for amplifying transmission signals, resistors 34, 35 for adjusting transmission levels, an antenna circuit 36 made of an LC series resonant circuit for actually transmitting electromagnetic waves, an electronic switch 37 that switches on or off the resistor 35 to be active or inactive, and by-time transmission level switching means 38 for controlling the electronic switch 37. The by-time transmission level switching means 38 typically operates as follows: With the control circuit 4 monitoring the end of transmission of each communication data block, the by-time transmission level switching means 38 receives a signal from the control circuit 4 each time the transmission of each communication data block is complete and generates a signal that controls the electronic switch 37 for switching operation.

The operation of the fourth embodiment is now discussed. The transmitter 5B in FIG. 8 is used to change transmission level on each communication data block in response to the signal from the by-time transmission level switching means 38. When the switch 37 is turned off, the output transmission level from the antenna circuit 36 is lowered. When the switch 37 is turned on, the output transmission level from the antenna circuit 36 is heightened. This switching sequence is repeated every transmission cycle of communication data block. Long-distance communication is performed with the switch 37 turned on, and short-distance communication is performed with the switch 37 turned off. The reader/writer thus covers communications from short range to long range with the same antenna.

Since this embodiment is characterized by its transmitter circuit, the transmission antenna circuit 36 is constructed of a series resonant circuit suited to transmission. The antenna circuit 36 is not limited to the series resonant circuit, and may be of a parallel resonant circuit. Furthermore, the antenna circuit 36 may accommodate not only a loop antenna but also any other type of antenna, and still after the same advantage. The antenna configuration may be constructed of two planes that are arranged in an L-shape in cross section. In this embodiment, the use of transmitter circuit 5B makes it unnecessary for a user to change one reader/writer and its antenna for short range operation to another reader/writer and its antenna for long range operation or vice versa. The same antenna covers communications from short range to long range.

Embodiment 5

Figure 9:
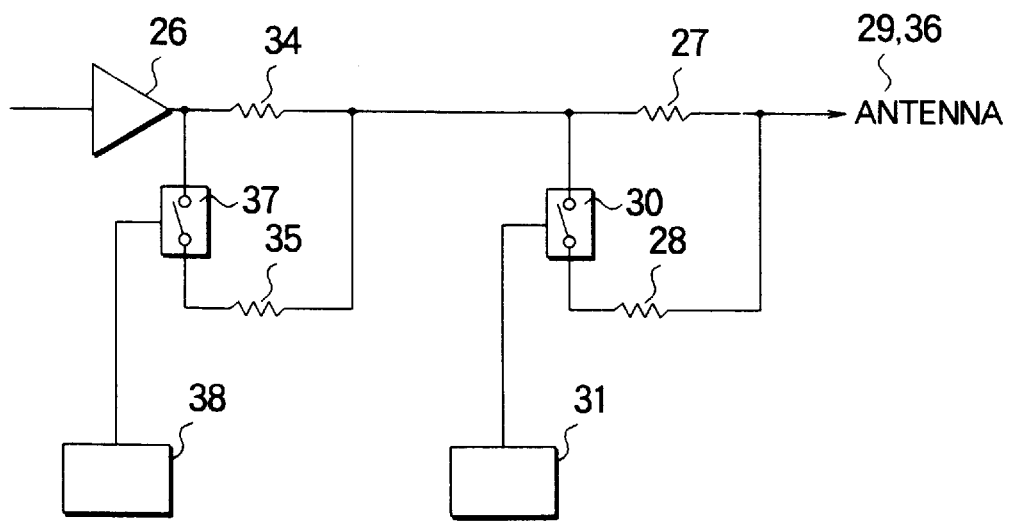
FIG. 9 is a circuit diagram showing the transmitter circuit disposed in the embodiment 5 of the non-contact IC card reader/writer according to the present invention.
Figure 10:
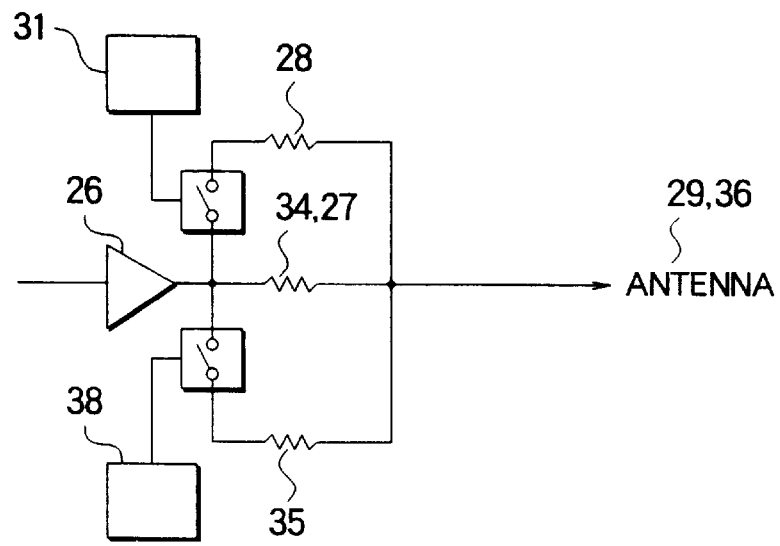
FIG. 10 is a circuit diagram showing another form of transmitter circuit disposed in the embodiment 5 of the non-contact IC card reader/writer according to the present invention.
Figure 11A:
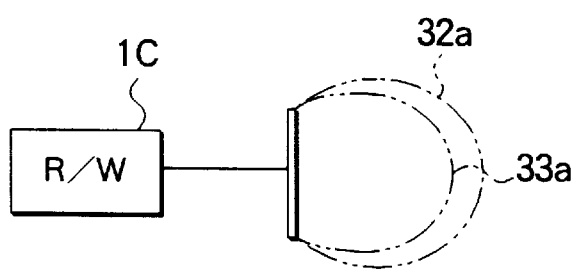
FIGS. 11A and 11B are a directivity pattern diagrams showing communicable range for short and long distance communications in the embodiment 5 of the present invention.
Figure 11B:
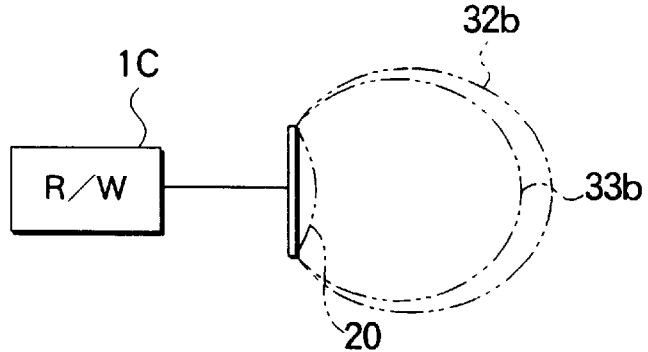

The fifth embodiment is a combination of the embodiments 3 and 4. As shown in FIG. 9, the embodiment 5 contains the transmitter circuit 5B in FIG. 8 and the transmitter circuit 5A in FIG. 6 in series connection, instead of the transmitter circuit portion of the transmitter-receiver circuit 5 in FIG. 2. In this case, a single amplifier 26 may be used to avoid duplication. As shown in FIG. 10, two resistors 28 and 35 may be connected in parallel with the resistor 27 or 34 so that the resistors 28 and 35 are switched by respective switches 31 and 38. According to this embodiment, regardless of whether the circuit of FIG. 9 or the circuit of FIG. 10, access areas 32*a*, 33*a*, 32*b*, and 33*b* result as shown in FIGS. 11A and 11B. FIG. 11A shows access areas when the transmission level is low. The access area during trigger signal transmission is represented by 33*a*, and the access area during data signal transmission is represented by 32*a*. FIG. 11B shows access areas when the transmission level is high. The access area during trigger signal transmission is represented by 33*b*, and the access area during data signal transmission is represented by 32*b*. With the embodiment incorporated into circuitry, the reader/writer communications system covers communications from short range to long range. Furthermore, since the trigger signal transmission level is set to be lower than the data signal transmission level, during use, the reader/writer communications system does not present a problem that the non-contact IC card receives a trigger signal but fails to continuously receive the data signal subsequent to the trigger signal. Communications reliability is thus enhanced.

The antenna connected the transmitter circuit may be configured like the antenna 22 or 24 in the first embodiment, or may be constructed of two antenna elements that are driven on a time sharing basis as discussed in connection with the second embodiment. Data communication is thus performed with enhanced communications reliability.

Embodiment 6

Figure 22:
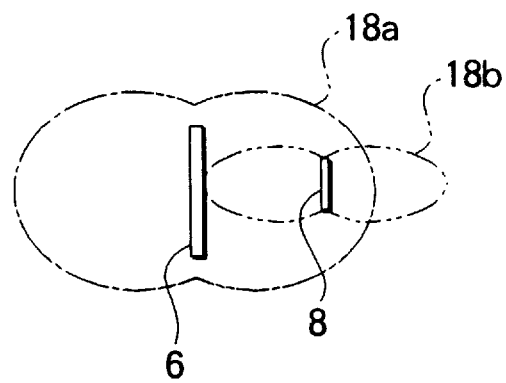
FIG. 22 is a directivity pattern diagram showing directivity patterns of the known flat loop antenna and the non-contact IC card.

The sixth embodiment is intended to expand communication range by providing a repeater as relay-means to relay electromagnetic waves between the reader/writer and the non-contact IC card. In the known reader/writer 1 in FIG. 18 or 19, a single antenna 6 is employed for a single reader/writer 1. The service area where communications are performed under the control of the external apparatus 2 by the antenna 6 is the access area 18*a* only (FIG. 22). Depending on the direction or orientation of the non-contact IC card 8, the service area is severely reduced as shown in FIG. 23. To expand communication range beyond the service area, there is no choice but to install another external apparatus 2 and another reader/writer 1.

Figure 12:
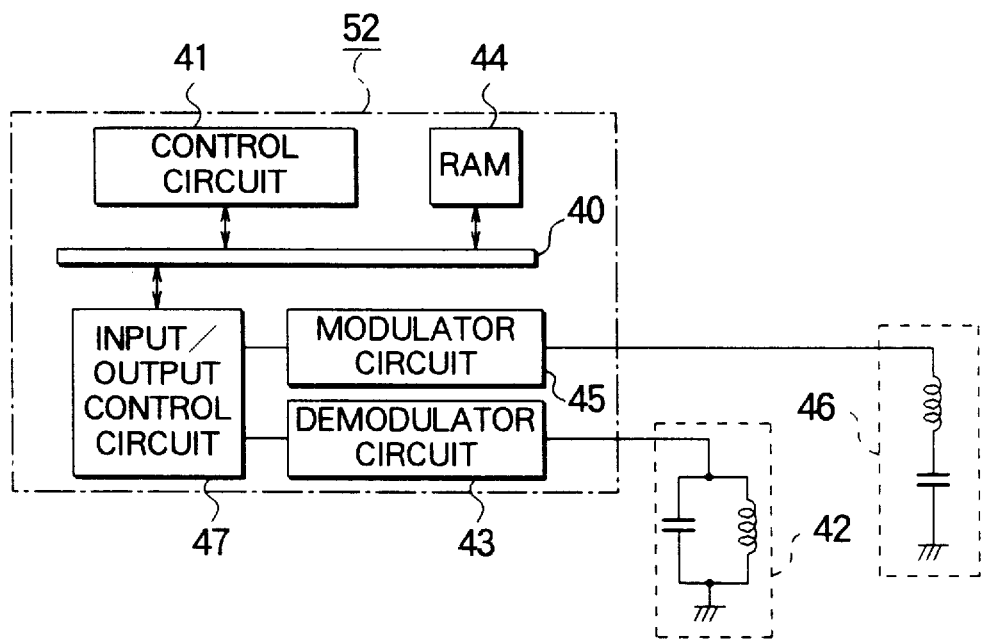
FIG. 12 is a block diagram showing the repeater as relay means in the embodiment 6 of the present invention.

FIG. 12 is the block diagram showing the repeater 52 as the sixth embodiment of the present invention. As shown, the repeater 52 comprises a control circuit 41 having a CPU (not shown) for performing control and a ROM (not shown) that stores the program for the CPU, a receiving antenna resonant circuit 42 for receiving a signal in the form of electromagnetic wave, a demodulator circuit 43 for demodulating the received signal into a digital signal, RAM 44 for temporarily storing the digital signal, a modulator circuit 45 for converting the digital signal into an analog signal, an input/output control circuit 47 electrically connected to both the modulator circuit 45 and demodulator circuit 43, for controlling input/output of the signals, a transmitting antenna resonant circuit 46 for transmitting a signal in the form of electromagnetic wave, and an internal bus 40 that is electrically connected to the control circuit 41, the input/output control circuit 47, and RAM 44. The antenna resonant circuits 42 and 46 may be integrated into a single circuit that may be commonly used for transmission and reception. The modulator circuit 45 and the demodulator circuit 43 may be integrated into a single modulator/demodulator circuit.

Figure 13:
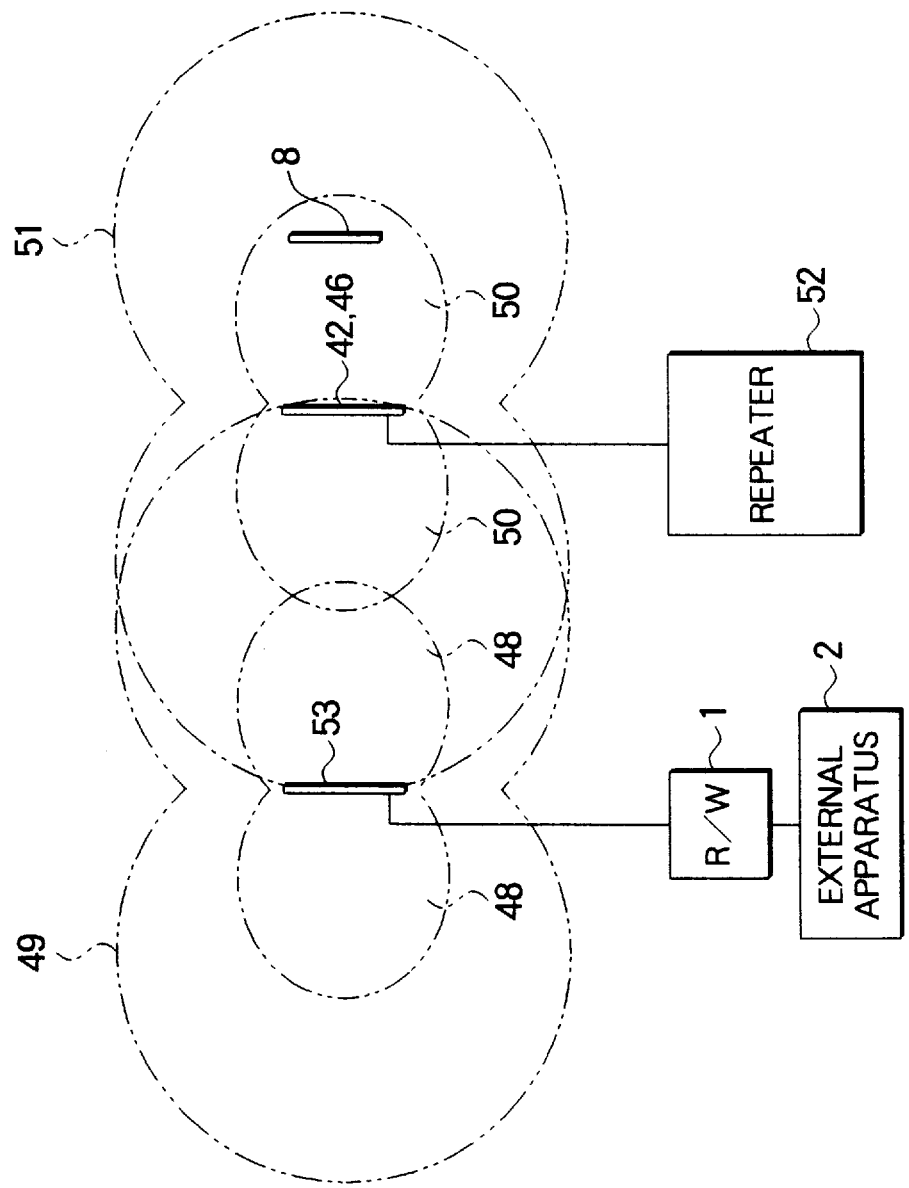
FIG. 13 is a directivity pattern diagram showing communicable range when the repeater of FIG. 12 is used.

FIG. 13 shows an access area 48 where the non-contact IC card 8 is communicable with the reader/writer 1, an access area 49 where the reader/writer 1 is communicable with the repeater 52, an access area 50 where the non-contact IC card 8 is communicable with the repeater 52, and an access area 51 where the repeater 52 is communicable with the reader/writer 1. An antenna 53 is connected to the reader/writer 1.

The operation of the above system is now discussed. The repeater 52 temporarily stores the received signal in RAM 44. Upon receiving a single communication data block, the repeater 52 amplifies and then transmits it through the antenna circuit 46. The repeater 52 performs no data processing at all, and it simply stores temporarily the received signal and immediately transmits it.

The operation is further detailed referring to FIG. 13. Communication range available in the known system of the reader/writer 1 and the non-contact IC card 8 has been the access area 48 only. In this embodiment, the use of the repeater 52 allows the external apparatus 2 to control the system within the access area 50 between the repeater 52 and the non-contact IC card 8. Since, regardless of its compact design, the non-contact IC card 8 accommodates all the required circuitry, and thus, its transmitting and receiving characteristics are not as good as those of the reader/writer 1 or the repeater 52. Therefore, the access areas 48 and 50 of the non-contact IC card 8 are substantially smaller than the access areas 49 and 51 of the reader/writer 1 and the repeater 51. By installing the repeater 52 beyond the access area 48 between the reader/writer 1 and the non-contact IC card 8, communication range controlled by the external apparatus 2 is substantially expanded.

An actual data reading process is now discussed. Suppose that the non-contact IC card 8 is within the access area 50 between the repeater 52 and the non-contact IC card 8. Since communication range of the non-contact IC card 8 to the reader/writer 1 is the access area 48, no direct communications link cannot be established between the IC card 8 and the reader/writer 1. The reader/writer 1 and the repeater 52 outperform the non-contact IC card 8 in transmitting and receiving characteristics, and the non-contact IC card 8 is thus communicable with the reader/writer 1 via the repeater 52. The repeater 52 receives the data reading signal for the non-contact IC card 8 from the reader/writer 1, and transmits it to the non-contact IC card 8 without processing. Although the data reading signal is also received by the antenna 53 of the reader/writer 1, the reader/writer 1 is designed not to receive by differentiating the data reading signal from signals originating from the non-contact IC card 8. The non-contact IC card 8, now within the access area 50 of the repeater 52, receives the data reading signal from the repeater 52, starts operating and transmits its internal data. The transmitted data is once received by the repeater 52 which in turn transmits it to the reader/writer 1. The reader/writer 1 receives consequently the data from the non-contact IC card 8.

Using the above sequence, a single external apparatus 2 can control the non-contact IC card 8 within the access area 50 of the repeater 52. In this embodiment, the receiving antenna 42 is constructed of a parallel resonant circuit which is suited to reception, and the transmitting antenna 46 is constructed of a series resonant circuit that is suited to transmission. The present invention is not limited to these circuits. Any other antenna configuration may be employed and present the same advantage. Furthermore, the use of a plurality of repeaters 52 is optional to expand the access areas. As described above, the use of the repeater 52 substantially increases communication range where a single external apparatus 2 can control the non-contact IC card 8 without the need for additional external apparatuses 2. Communications reliability is enhanced up to long range, and malfunction due to data communication error is thus prevented. Since the repeater 52 itself operates off-line, maximum flexibility in its installation is allowed with no particular installation requirements imposed. The repeater 52 may be easily incorporated into an existing system without any particular modification added, in order to expand communication range.

Embodiment 7

Figure 14:
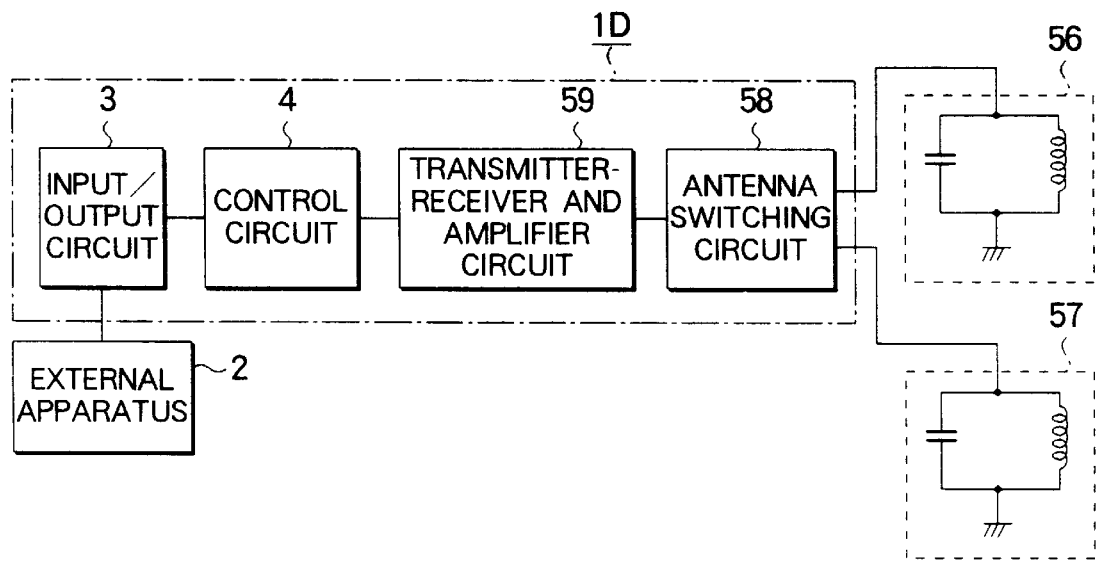
FIG. 14 is a block diagram showing the construction of the embodiment 7 of the non-contact IC card reader/writer according to the present invention.
Figure 15:
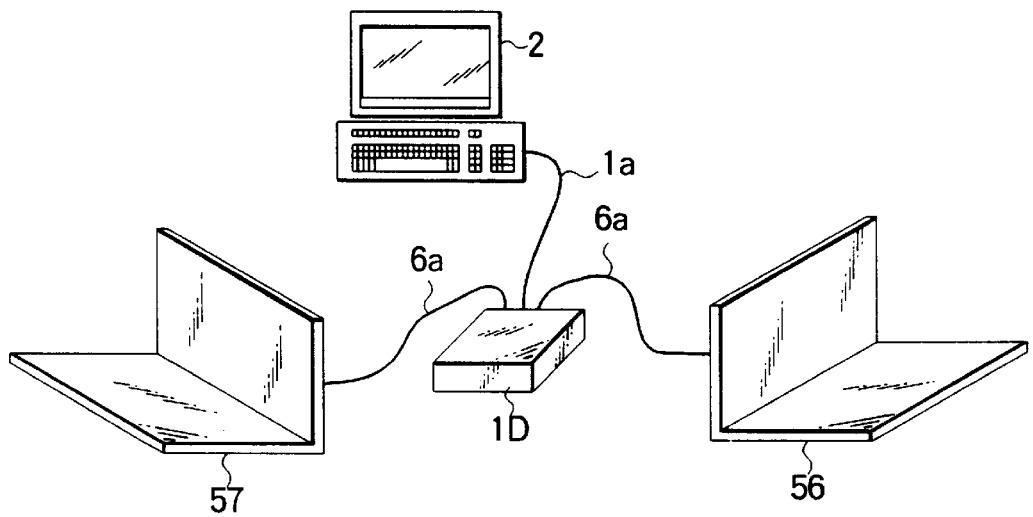
FIG. 15 is a perspective view showing the communications system using the non-contact IC card reader/writer of FIG. 14.

FIGS. 14 and 15 show the seventh embodiment of the present invention. As shown, the seventh embodiment comprises two transmitting/receiving antennas 56 and 57 connected to a single reader/writer 1D to expand communication range between the reader/writer 1D and the non-contact IC card 8. Switched between the two transmitting/receiving antennas 56 and 57 at predetermined regular intervals on a time sharing basis, the reader/writer 1D communicates with the non-contact IC card 8. Two transmitting/receiving antennas 56 and 57 are spaced apart so that both may not interfere with each other. The arrangement as described above helps expand communication range.

As shown in FIG. 14, the reader/writer 1D in this embodiment comprises an input/output circuit 3 for inputting and outputting signals with the external apparatus 2, a control circuit 4 for controlling the operation of the reader/writer 1D, a transmitter-receiver and amplifier circuit 59 for modulating, demodulating, and amplifying signals, and an antenna switching circuit 58 for switching back and forth between the transmitting/receiving antennas 56 and 57.

The operation of the embodiment 7 is now discussed. The antenna switching circuit 58 in the reader/writer 1D switches back and forth between the transmitting/receiving antennas 56 and 57 at predetermined regular intervals on a time sharing basis to perform communications within either the access area of the antenna 56 or the access area 57. The use of the reader/writer 1D expands communication range with the non-contact IC card 8, and achieves an improved communications reliability.

In this embodiment, each of the transmitting/receiving antennas 56 and 57 is constructed of an LC parallel resonant circuit. The present invention is not limited to this circuit, and may incorporate any other antenna type with the same degree of advantage. As already described in the embodiment 1, the antenna may be L-shaped in cross section to expand the access areas even further. The communications reliability is enhanced accordingly. Communication range may be expanded even more if three or more transmitting/receiving antennas are used.

Embodiment 8

Figure 16:
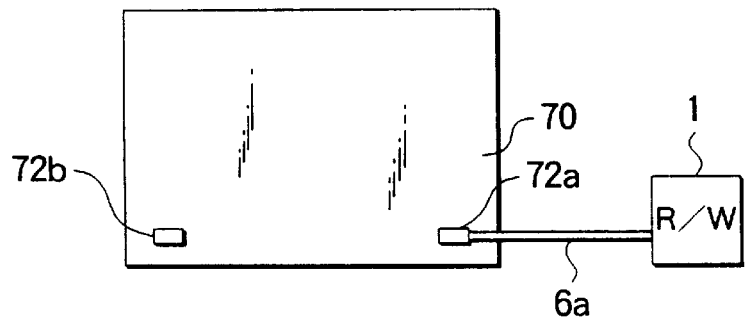
FIG. 16 is a rear view showing the antenna of the embodiment 8 of the non-contact IC card reader/writer according to the present invention.

FIG. 16 is the rear view of the transmitting/receiving antenna of the reader/writer in the eighth embodiment of the present invention. As shown, a transmitting/receiving antenna 70 in the embodiment is provided with two connection means 72a and 72b such as connectors. The antenna cable 6a may be connected to either the connection means 72a or the connection means 72b, as desired.

Figure 25:
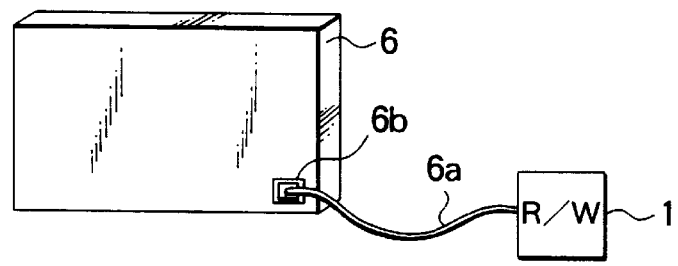
FIG. 25 is a rear view showing the antenna of the known non-contact IC card reader/writer.
Figure 26:
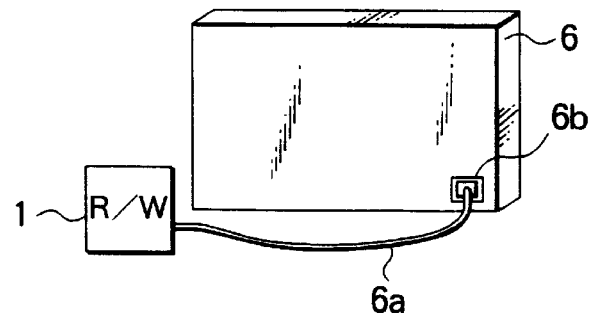
FIG. 26 is a rear view showing the antenna of the known non-contact IC card reader/writer.

The known antenna 6 has a single connection means 6b that is connected to the reader/writer 1 as shown in FIG. 25. Depending an installation conditions, the antenna cable 6a must run behind the antenna 6 as shown in FIG. 26. As already described, the antenna 6 is constructed of a loop antenna, and its directivity has its two high-gain main lobes, one orienting frontward and the other orienting rearward, corresponding to two access areas. If the antenna cable 6a that conducts signals exists within one of the main lobes or access areas, the signals mutually interfere with each other. Interfering signal is received as noise, and data communication is thus subject to error.

According to this embodiment, the connection blocks 72a and 72b are selectively used to accommodate a diversity of installation layout between the transmitting/receiving antenna 70 and the reader/writer 1 so that the antenna cable may not run across behind the antenna 70. The embodiment 8 therefore prevents such a problem that signal interference between the antenna cable 6a and the antenna 6 creates noise interfering normal communications.

In the above-mentioned related art, the reader/writer 1 is connected to the antenna 6 via the antenna cable 6a. A single connection block 6b only is available for connection with the antenna cable 6a. Since the cable run is limited, the antenna 6 is obliged to be installed in a close vicinity of the reader/writer 1 due to installation environments, possibly near enough for mutual interference of signal and noise to affect data communication adversely. In this embodiment, since the connection means 72a and 72b are selectively available, the antenna 70 is spaced from the reader/writer 1. Mutual interference between signal and noise originating from each unit is controlled, and malfunction due to such interference is avoided.

Figure 17A:
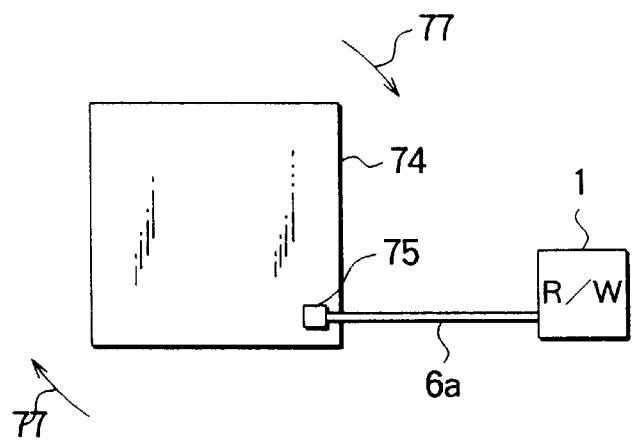
FIGS. 17A and 17B are rear views showing another form of the antenna of the embodiment 8 of the non-contact IC card reader/writer according to the present invention.
Figure 17B:
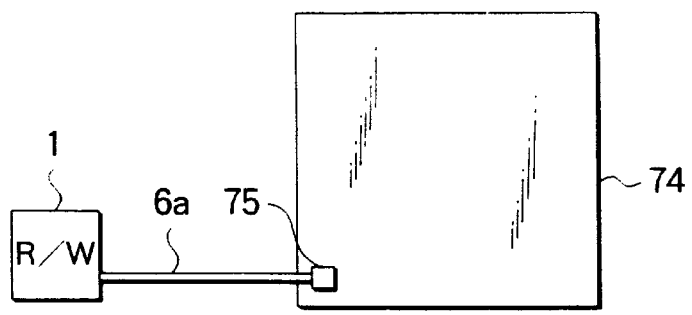

In this embodiment, the antenna 70 is constructed of a rectangular antenna. The present invention is not limited to this type of antenna. The antenna 70 may be of an L-shaped cross-section antenna as in FIG. 1. Alternatively, a square antenna 74 shown in FIG. 17A may be used. The square antenna 74 is provided with a connection means 75 at its one corner. To install the antenna 74 in a manner that meets each installation condition, it may be rotated clockwise by 90° in the direction of the arrow 77 as shown in FIG. 17B. In the same manner as in the above embodiment, the antenna cable 6a is routed so that it may not run across behind the antenna 74, with the same advantage associated. Regardless of installation and operating conditions, signal interference between the antenna, the antenna cable, and the reader/writer main block is prevented. Malfunction in communications is thus avoided.

According to an aspect of the present invention, the board of the antenna means of the non-contact IC card reader/writer is constructed of the plurality of plane portions that make an angle with each other and along which a conductor wire is wound in a coil. One of the plane portions in the antenna means may be of right-angle antenna geometry with the non-contact IC card in a random orientation. When viewed from the non-contact IC card, the directivity of the antenna means is relatively uniform. Therefore, the user of the card can constantly enjoy a successful communication without paying attention to the orientation of the card. Malfunction of the system due to data communication error is prevented. Normal communications are thus constantly assured.

According to another aspect of the present invention, the board of the antenna means of the non-contact IC card reader/writer is constructed of a plurality of plane portions which are spaced apart and make an angle to each other and on each of which a conductor wire is coiled. One of the boards in the antenna means is necessarily in approximate parallel antenna geometry with the non-contact IC card which may include a random orientation. Normal communications are thus constantly assured. Furthermore, since the plurality of plane portions are arranged in an arbitrary angle, convenience of design is enhanced.

According to still another aspect of the present invention, the board of the antenna means is constructed of a plurality of plane portions that are spaced apart and a plurality of conductor wires disposed on the plane portions, and furthermore the communication control means is provided to switch the conductor wires on a time sharing basis. Regardless of orientation of the non-contact IC card, the conductor wire disposed on any plane portion that is properly oriented is used for communications. Communications reliability is thus enhanced.

According to yet another aspect of the present invention, the by-signal level switching means is provided to switchably select transmission level to the non-contact IC card, namely switch between data transmission level and trigger transmission level, wherein the data transmission level is set to be higher than the trigger transmission level. Once the non-contact IC card is activated by the trigger signal, it assuredly acquires the data signal subsequent to the trigger signal.

According to a further aspect of the present invention, the by-time level switching means is provided to switch the transmission level every cycle of transmission to transmit the signal of the same content at a plurality of transmission levels. There is no need for replacing the antenna means between long and short distance communications. The same antenna means serves both the long and short distance communications. Communication range of an existing system is thus easily expanded without any major modification incorporated.

According to still a further aspect of the present invention, the by-signal level switching means is provided to switch between data transmission level and trigger transmission level, and furthermore the by-time level switching means is provided to switch the transmission level every cycle of transmission. Thus, the same antenna means serves commonly long- and short-distance communications. When the non-contact IC card is activated by the trigger signal, it assuredly acquires the data signal subsequent to the trigger signal.

According to an additional aspect of the present invention, a plurality of antenna means are provided. Communicable range is easily expanded.

According to yet another aspect of the present invention, the reader/writer main body is provided with a plurality of connection means that are selectively connected to the antenna cable of the antenna means to meet operating environments. This arrangement makes it unnecessary for the antenna cable to run across behind the antenna means, thereby avoiding interference between the antenna cable and the antenna means. Malfunction due to signal interference is thus avoided.

According to yet a further aspect of the present invention, the repeater is provided to function as relay means between the antenna of the non-contact IC card reader/writer and the non-contact IC card. Communication range of an existing system is thus easily expanded without any major modification.

What is claimed is:

1. A non-contact IC card reader/writer system comprising:

a reader/writer main body electrically connected to a host machine for controlling data communication;

antenna means disposed externally to and electrically connected to said reader/writer main body for transmitting and receiving electromagnetic waves to and from the non-contact IC card in a wireless manner, said antenna means having a board with a plurality of plane portions, the plane portions being arranged at an angle to each other, and a conductor wire being wound in a coil about each of the plurality of plane portions;

input/output means electrically connected to the host machine for inputting and outputting a bidirectional signal to and from the host machine;

transmitter-receiver means for modulating and demodulating electromagnetic waves including trigger signals and data signals transmitted and received by said antenna means;

control means electrically connected between said input/output means and said transmitter-receiver means for controlling the data communication; and bi-signal level switching means for switching the strength of the output electromagnetic waves emitted by said antenna means between a first level for the trigger signal and a second level for the data signal.

2. The non-contact IC card reader/writer systems as claimed in claim 1, wherein said plurality of plane portions of said board of said antenna means are connected integrally to each other at a side and a conductor wire is wound in a coil along said plane portions.

3. A non-contact IC card reader/writer system comprising:

a reader/writer main body electrically connected to a host machine for controlling data communication;

antenna means disposed externally to and electrically connected to said reader/writer main body for transmitting and receiving electromagnetic waves to and from a non-contact IC card in a wireless manner, said antenna means having a board with a plurality of plane portions, said plurality of plane portions being arranged at an angle to and separated from each other, wherein a conductor wire is wound in a coil about each of the plurality of plane portions;

input/output means electrically connected to the host machine for inputting and outputting a bi-directional signal to and from the host machine; and transmitter/receiver means for modulating and demodulating electromagnetic waves transmitted and received by the antenna means; and antenna control means for switching between conductor wires on said plurality of plane portions at predetermined intervals, wherein said antenna control means monitors a time period between completion of transmission of one of the electromagnetic waves transmitted by said antenna means and reception of a response to the electromagnetic waves transmitted by said antenna means and wherein said antenna control means switches from a first conductor wire on one of the plurality of plane portions to a second conductor wire on another of the plurality of plane portions when the time period monitored by said antenna control means is greater than a predetermined time period.

4. A non-contact IC card reader/writer system comprising:

a reader/writer main body electrically connected to a host machine for controlling data communication;

antenna means disposed externally to and electrically connected to said reader/writer main body for transmitting and receiving electromagnetic waves to and from the non-contact IC card in a wireless manner, said antenna means having a board with a plurality of plane portions, the plane portions being arranged at an angle to each other, and a conductor wire being wound about the plurality of plane portions in a coil;

input/output means electrically connected to the host machine for inputting and outputting a bidirectional signal to and from the host machine;

transmitter-receiver means for modulating and demodulating electromagnetic waves including data signals, the electromagnetic waves being transmitted and received by said antenna means;

control means electrically connected between said input/output means and said transmitter-receiver means for controlling the data communication; and bi-time level switching means for switching the strength of the output electromagnetic waves after each data signal transmission cycle to transmit a signal of the same content at a plurality of transmission signal strengths.

5. The non-contact IC card reader/writer system as claimed in claim 4, further comprising bi-signal level switching means for switching the strength of the output electromagnetic waves emitted by said antenna means between a first level for a trigger signal and a second level for a data signal.

6. The non-contact IC card reader/writer systems as claimed in claim 1, comprising a plurality of said antenna means.

7. The non-contact IC card reader/writer systems as claimed in claims 1, wherein the reader/writer main body includes a plurality of connection means for being selectively and electrically connected to said antenna means.

8. A non-contact IC card reader/writer system as claimed in claim 1 further comprising a repeater including an antenna circuit remotely disposed between said antenna means of said non-contact IC card reader/writer and said non-contact IC card, for performing transmission and reception of electromagnetic waves between said non-contact IC card reader/writer and said non-contact IC card, control means for controlling transmission and reception of the electromagnetic waves, memory means for temporarily storing the demodulated signals, modulator means for modulating the temporarily stored signals; and input/output control means electrically connected to said demodulator means and said modulator means for controlling input and output of signals.

9. The non-contact IC card reader/writer as claimed in claim 3 wherein said antenna control means switches conductor wires from one of the plurality of plane portions to another one of the plurality of plane portions responsive to the electromagnetic waves transmitted by said transmitter/receiver.

10. The non-contact IC card reader/writer system as claimed in claim 1 wherein said bi-signal level switching means includes:

a data status signal circuit that generates a signal responsive to the data signal;

an amplifier for amplifying transmission signals, said amplifier including output resistors; and a switch coupled to said data status circuit and to said amplifier to switch the output resistors in response to the signal generated by said data status circuit to said amplifier.

* * * * *